United States Patent [19]

Nakamaru et al.

[11] Patent Number: 5,300,366
[45] Date of Patent: Apr. 5, 1994

[54] FLUORORESIN COMPOSITION FOR A SLIDING MEMBER AND A SLIDING MEMBER

[75] Inventors: Takashi Nakamaru, Sagamihara; Tadashi Watai, Ayase; Masayuki Rokugawa, Hiratsuka; Kouichi Tsunoda, Yamoto; Tadayoshi Umeki, Kurita; Takayuki Miyaji; Kenji Yamada, both of Fujisawa, all of Japan

[73] Assignee: Oiles Corporation, Tokyo, Japan

[21] Appl. No.: 693,243

[22] Filed: Apr. 29, 1991

[30] Foreign Application Priority Data

May 9, 1990 [JP] Japan ............................ 2-119591
Jan. 18, 1991 [JP] Japan ............................ 3-16773

[51] Int. Cl.⁵ ............................................. B22F 7/02
[52] U.S. Cl. .................................... 428/549; 428/550; 428/551; 428/553; 428/567; 428/560; 428/539.5
[58] Field of Search ............... 428/549, 550, 551, 553, 428/566, 567, 568, 539.5, 560

[56] References Cited

U.S. PATENT DOCUMENTS

| | | | |
|---|---|---|---|
| 3,218,255 | 11/1965 | Pratt | 252/12 |
| 3,899,227 | 8/1975 | Harig | 308/237 R |
| 4,238,137 | 12/1980 | Furchak et al. | 308/3 R |
| 4,312,772 | 1/1982 | Mori | 252/12.2 |
| 4,624,887 | 11/1986 | Bickle et al. | 428/256 |
| 4,847,135 | 7/1989 | Braus et al. | 428/138 |

FOREIGN PATENT DOCUMENTS

| | | |
|---|---|---|
| 1469894 | 6/1969 | Fed. Rep. of Germany . |
| 60-18696 | 2/1977 | Japan . |
| 56-34020 | 8/1981 | Japan . |
| 1-22486 | 2/1985 | Japan . |
| 60-65049 | 4/1985 | Japan . |
| 61-97335 | 5/1986 | Japan . |
| 61-148238 | 7/1986 | Japan . |
| 62-81442 | 4/1987 | Japan . |
| 62-109844 | 5/1987 | Japan . |
| 62-223255 | 10/1987 | Japan . |
| 63-280922 | 11/1988 | Japan . |
| 1-138255 | 5/1989 | Japan . |
| 2-107818 | 4/1990 | Japan . |
| 8600326 | 1/1986 | World Int. Prop. O. . |

Primary Examiner—Peter A. Nelson
Assistant Examiner—Chrisman D. Carroll
Attorney, Agent, or Firm—Nixon & Vanderhye

[57] ABSTRACT

Disclosed herein are a fluororesin composition for a sliding member comprising a fluororesin, at least one of fillers selected from the group consisting of glass fiber, glass powder, carbon fiber and carbon powder, and a phosphate, and a sliding member thereof.

19 Claims, 4 Drawing Sheets

FLUORORESIN COMPOSITION FOR A SLIDING MEMBER AND A SLIDING MEMBER

BACKGROUND OF THE INVENTION

The present invention relates to a fluororesin composition for a sliding member comprising a fluororesin, a phosphate and a filler composed of glass fiber, glass powder, carbon fiber or carbon powder, and a sliding member comprising the fluororesin composition, which has an excellent sliding property especially under conditions of a low speed and a high load (high surface pressure).

A polytetrafluoroethylene (which is abbreviated as "PTFE" hereinafter), which is one of the fluororesins, is not only excellent in heat resistance and chemical resistance but also has a low friction coefficient with a self-lubricating property, so that it is widely used in various fields as a representative of the so-called engineering plastics such as a material for a sliding member such as bearings and gears, and a molded article such as a tube and a valve. However, its wear resistance is not necessarily sufficient, and the deformation (creep) due to a load is large, so that its use is restricted under a high load or a high temperature.

However, a sliding member consisting of this PTFE is inferior in wear resistance and the creep resistance, so that depending on the use of the sliding member, for example, ① by blending PTFE with a filler such as graphite, molybdenum disulfide, glass fiber or the like, or ② by impregnating PTFE in and coating PTFE on a porous sintered metal layer integrally formed on a thin steel plate, the above-mentioned drawbacks are solved.

The sliding member of the above-mentioned embodiment ② is one so-called as a multi-layer sliding member having a thin wall-thickness of the member itself (usually 1.5 to 3.0 mm) and showing a greatly improved load resistance, so that it is suitable for the use under conditions of low speed and high load.

However, on the other hand, in the case where an with a large grasping force (high surface pressure) and the rotation of the opposite member is smoothly supported with by sliding (in other words, a portion in which a clearance between the sliding member and the opposite member is loose) such as, for example, a hinge portion of various doors or a sliding portion of a ball joint for automobiles, creep and the like of the sliding member itself occurs and as a result it is absolutely impossible to withstand repeated use.

As sliding materials for solving the above-mentioned problems, for example, there have been proposed:

(1) a coated sheet as a bearing material comprising a metal net and a fluoropolymer sintered thereto, where intersectional wires of the metal net themselves are melted to be connected with each other by a thermal operation at intersectional portions (Japanese Patent Publication No. 35107-1978 corresponding to U.S. Pat. No. 3,899,227), and (2) a sliding member comprising as a base body an expanded metal of stainless steel or a phosphorous bronze alloy provided with regular networks, and a lubricating composition containing a polytetrafluoroethylene as a main component with 5 to 30% by weight of a phenol resin subjected to heat-treatment and/or addition polymerization type polyimide resin as a filler, which is filled in the networks of the base member and coated on the base member (Japanese Patent Application Laid-open (KOKAI) No. 79417/1989).

Moreover, as sliding members containing a fluororesin as a main component, there have been hitherto proposed:

(3) a porous structural article having a tetrafluoroethylene resin coating on one surface such that when an unsintered tetrafluoroethylene resin mixture containing a liquid lubricant is placed on the surface of a porous structural article to be coated in a powder state as it is or having been molded beforehand so as to perform rolling and coating between two rolls, a layer, interposed from the surface of the roll on the side of contacting with its back surface to the surface of the roll, is formed of a material which is soft and is allowed to enter into the surface of the porous structural article, and the resultant layer is rolled (Japanese Patent Publication No. 19053/1964), (4) a lining foil comprising a metal textile, a fluoroplastic, and a material containing a reinforcing material of inorganic fiber, in which a fluoroplastic filled with glass fiber or other inorganic fiber, preferably polytetrafluoroethylene or fluoroethylenepropylene is rolled, extruded, or pressed in the form of powder, paste, or an unsintered subassembly on the metal textile at a processing temperature of a room temperature or a high temperature, and the obtained product is baked at a temperature not less than the melting point of said used fluorine polymer (Japanese Patent Publication No. 23740/1980), (5) a sliding bearing member made of an expanded metal having a thickness of 0.3 to 0.9 mm which is a wrought aluminum alloy having an elongation at breakage ($\delta_5$) of 8 to 20% and a Brinell hardness (HB) of 35 to 65 and a matrix containing 5 to 25% by volume of lead, 10 to 50% by volume of glass fiber, and 40 to 80% by weight of polytetrafluoroethylene, in which the open portions of the expanded metal are filled with the matrix. The expanded metal is coated with the matrix so that a friction sliding layer composed of the matrix is formed at a thickness of 0.01 to 0.3 mm. The matrix also contains 10 to 50% by volume of zinc sulfide or barium sulfate having a particle size range of 0.1 to 1.0 $\mu m$ (Japanese Patent Application Laid-open (KOKAI) No. 57919/1988 corresponding to U.S. Pat. No. 4,847,135), (6) a slide bearing including a rigid backing pad having a face, a metal mesh covering the face of the pad, means fixedly securing the mesh to the pad, and a sheet or low friction bearing material overlaying the mesh and having a portion of its thickness pressed into the mesh to interlock the bearing material with the mesh (U.S. Pat. No. 4,238,137), (7) a sheet material for sliding surface bearings, consisting of a network of expanded metal coated with a fluorine-containing polymer, having a network of expanded metal, which consists of a wrought aluminum alloy having an elongation at break $\delta_5=8$ to 20% and a Brinell hardness HB 35 to 65 and which has a coating of a blend of 5 to 25% by volume lead, 10 to 50% by volume glass fibers, and 40 to 80% by volume polytetrafluoroethylene (European Patent No. 40448B), and (8) a sheet material for sliding surface bearings made of an expanded metal mesh composed of a wrought aluminum alloy having an elongation at break $\delta_5=8$ to 20% and a Brinell Hardness Number HB of 35 to 65; a primer layer coating the surface of the expanded metal mesh having a thickness of 2 to 10 micrometers; and on the primer layer another layer composed of 10 to 30 wt.

% of a filler for improving the thermal conductivity and wear resistance, 10 to 30 wt. % glass fibers and 40 to 80 wt. % polytetrafluoroethylene (PTFE) (U.S. Pat. No. 4,624,887).

Conventionally, in order to improve the wear resistance and the creep resistance previous experiments have added various fillers such as glass fiber, glass beads, carbon fiber, carbon powder and the like.

However, since fillers such as glass fiber and the like are hard, these fillers sometimes damage the opposite member and further the PTFE itself is cut and removed, so that there is a risk of causing abrasive wearing. As a result, depending on the amount of the filler, the wearing amount tends to increase.

Also, the sliding member with a metal network structure as a base member becomes sufficiently intimate with the surface of the opposite member owing to the flexibility generated in its thickness direction. This avoids creep and permits rotation of the opposite member which remains smoothly supported.

Depending on the use of the sliding member, electrical conductivity may be required for the sliding member.

Applicants have found that by adding glass fiber, glass powder, carbon fiber and/or carbon powder as a filler, and a phosphate to a fluororesin such as polytetrafluoroethylene, mixing them homogeneously to obtain a fluororesin composition, pressing and molding it at a normal temperature at 300 to 600 kg/cm$^2$, and baking (heating) it under normal pressure at 360° to 380° C., the thus obtained sliding member exhibits a stable performance with a low friction coefficient showing no damage to an opposite member at all during sliding and is electrically conductive.

SUMMARY OF THE INVENTION

In a first aspect of the present invention, there is provided a fluororesin composition for a sliding member comprising a fluororesin, at least one filler selected from the group consisting of glass fiber, glass powder, carbon fiber and carbon powder, and a phosphate.

In a second aspect of the present invention, there is provided a sliding member comprising a metal network structure and the fluororesin composition as defined in the 1st aspect which is filled in networks and coated on the surface of the metal network structure.

In a third aspect of the present invention, there is provided a sliding member comprising a metal network structure and a fluororesin composition comprising a polytetrafluoroethylene, 5 to 30% by weight of carbon fiber as the filler and 0.1 to 15% by weight of a phosphate, which is filled in the networks and coated on the surface of the metal network structure.

In a fourth aspect of the present invention, there is provided a multi-layer sliding member comprising a porous sintered metal layer formed on a steel back plate and the fluororesin composition as defined in the 1st aspect is impregnated in and coated on the porous sintered metal layer.

In a fifth aspect of the present invention, there is provided a multi-layer sliding member comprising the porous sintered metal layer formed on a steel back plate and a fluororesin composition comprising a polytetrafluoroethylene, 5 to 30% by weight of carbon fiber as the filler, and 0.1 to 15% by weight of a phosphate, which is impregnated in and coated on the porous sintered metal layer.

BRIEF DESCRIPTION OF THE DRAWINGS

FIG. 1 shows wear depth values measured in which various amounts of calcium hydrogenphosphate (anhydrous) are contained in a PTFE (Fluon G 190) which also contains 15% by weight of glass fiber (MFA).

With respect to the fluororesin composition FIG. 2, shows wear values measured in which various amount of glass fiber (MFA) are contained in the same PTFE which also contains 5% by weight of calcium hydrogenphosphate (anhydrous).

FIG. 3 shows wear resistance values measured in which various amounts of calcium pyrophosphate are contained in the same PTFE which also contains 15% by weight of CF (Zyrous) treated at a high temperature.

FIG. 4 shows values measured in which various amounts of CF (Zyrous) treated at a high temperature are contained in the same PTFE which also contains 5% by weight of calcium pyrophosphate.

DETAILED DESCRIPTION OF THE INVENTION

Figure 1:
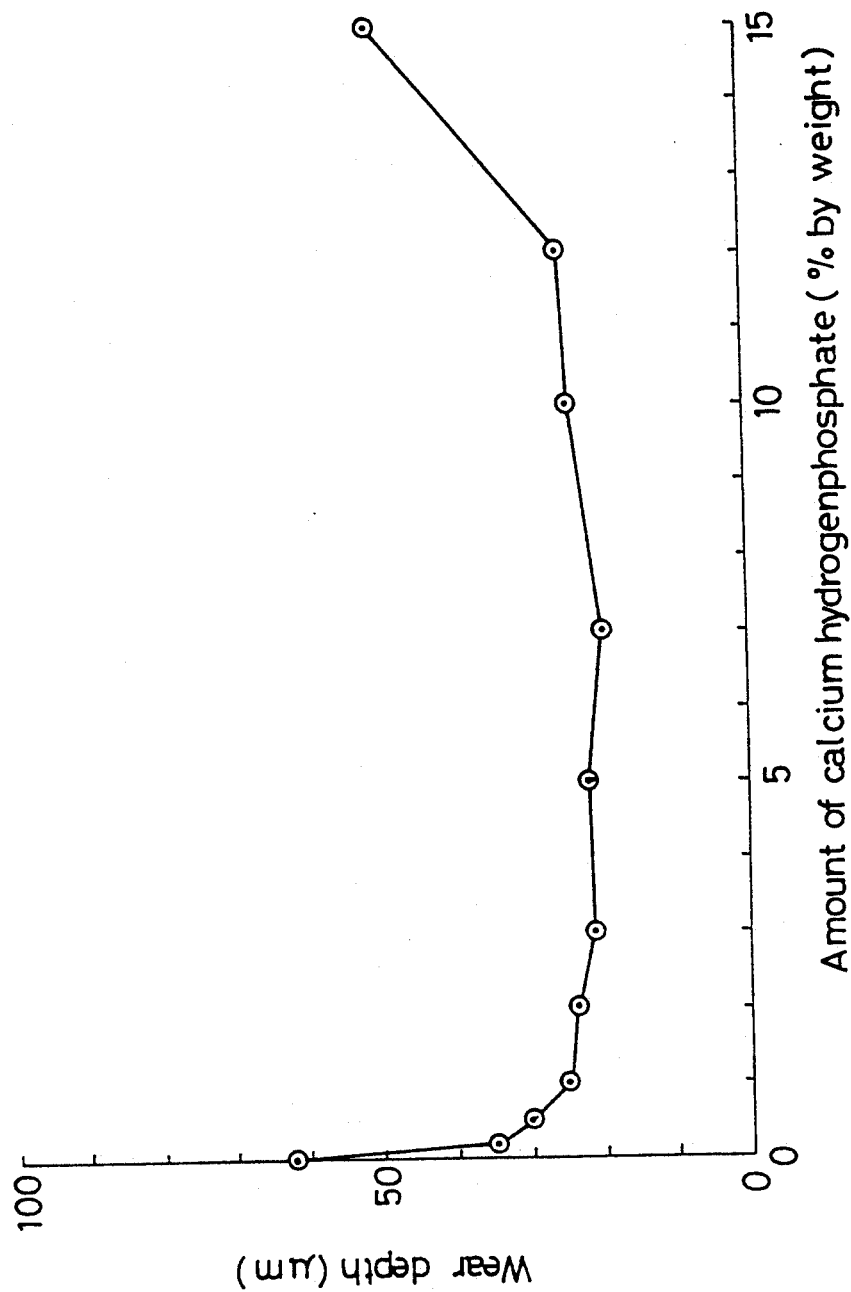
FIGS. 1 to 4 are figures showing the wear depth in thrust tests of various fluororesin compositions.

The fluororesin component of the compositions of the present invention can be exemplified as conventionally known PTFE (polytetrafluoroethylene), FEP (tetrafluoroethylene-hexafluoropropylene copolymer), PFA (tetrafluoroethylene-perfluoroalkylether copolymer) and the like. Among them, PTFE is especially preferable. PTFE is a homopolymer of tetrafluoroethylene, which is one kind of fluororesin commercially available under trademarks and trade names such as Argoflon (produced by Montedison S.p.A.), Teflon (produced by E.I. du Pont de Nemours & Company), Fluon (produced by ICI Ltd.), Polyflon (produced by Daikin Industries, Ltd.), Teflon 6CJ and Teflon 6J (produced by Mitsui du Pont Fluorochemical, Co., Ltd.), Fron CD-01, CD-123, CD-076, CD-126, and CD-4 (produced by Asahi Glass Co., Ltd.), and Polyflon F103, F101, F101E, and F201 (produced by Daikin Industries, Ltd.). These resins are capable of compression molding but incapable of ordinary injection molding.

The glass fiber or glass powder to be used as the filler for the fluororesin composition of the present invention includes glass fiber and glass powder which have been usually used in this technical field, namely amorphous silicate glass, borate glass and further includes wollastonite, potassium titanate whiskers and the like.

Glass fibers having a diameter ($\phi$) of 1 to 20 μm are preferable, and especially glass fiber having a diameter of 8 to 12 μm are preferable.

A length (l) of the glass fiber is preferably 20 μm to 1 mm, 50 to 300 μm being especially preferable. In addition, it is preferable to use fibers having an aspect ratio of not less than about 5:1.

Conventional glass powder may be used. The average particle size of the glass powder is preferably in the range of 1 to 50 μm, more preferably 5 to 30 μm.

In addition, carbon fiber (CF) which can be used as a filler for the fluororesin composition of the present invention imparts electrical conductivity to the fluorororesin composition. Preferred is pitch type carbon fiber treated at a low temperature (about 1000° to 1500° C.), pitch type carbon fiber treated at a high temperature (about 2000° to 2500° C.), PAN type carbon fiber and phenol type carbon fiber. From the view point of giving a high electrical conductivity to the fluororesin composition, the pitch type carbon fiber treated at a high temperature is more preferable.

The diameter ($\phi$) and fiber length (l) of the carbon fiber are preferably 1 to 20 μm and 30 μm to 3 mm respectively, and especially those having a diameter of about 8 to 12 μm and a length of about 80 to 120 μm are preferable.

A concrete example of the pitch type carbon fiber is Zyrous (trade name) ($\phi=12$ μm, $l=100$ μm) produced by Nitto Boseki Co., Ltd. A concrete example of the PAN type carbon fiber is Pyrofil produced by Mitsubishi Rayon Co., Ltd., and a concrete example of the phenol type carbon fiber is Kainol CF16BT produced by Japan Kainol Co., Ltd.

Preferred examples of the carbon powder include Bellpearl C600 (obtained by treating Bellpearl R800 at 600° C.) and Bellpearl C2000 (obtained by treating Bellpearl R800 at 2000° C.) which are spherical phenol resin particles produced by Kanebo Ltd. In addition, pre-calcined coke having an average particle size of 11 to 16 μm is as a preferable carbon powder.

The average particle size of the carbon powder is preferably in a range of 1 to 40 μm, more preferably 5 to 30 μm.

The amount of the filler to be used in the present invention is 1 to 40% by weight, and in order to give suitable wear resistance and creep resistance, in the case of the glass fiber and the glass powder, about 1 to 40% by weight, especially about 5 to 30% by weight are preferable, and in the case of the carbon fiber and the carbon powder, about 1 to 30% by weight, preferably 2 to 20% by weight, especially 5 to 20% by weight are preferable.

Suitable phosphates include metal salts such as tertiary phosphate, secondary phosphate, pyrophosphate, phosphite, metaphosphate and the like and mixtures thereof.

Among them, metal salts of tertiary phosphate, secondary phosphate, and pyrophosphate are preferable. Suitable metals include alkali metal, alkaline earth metal, and transition metal. Among these metal salts, alkali metal and alkaline earth metal are preferable, and especially Li, Ca, Mg, and Ba are more preferable.

Concretely, $Li_3PO_4$, $Li_2HPO_4$, $Li_4P_2O_7$, $Ca_3(PO_4)_2$, $Ca_2P_2O_7$, and $CaHPO_4(.2H_2O)$ are most preferable as the phosphate to be used in the present invention.

Furthermore, hydroxyapatite represented by the formula $Ca_{10}(PO_4)_6(OH)_2$ can be preferably used as the phosphate of the present invention.

A phosphate having an average particle size not more than 20 μm for mixing homogeneously is preferred.

In addition, with respect to those crystal particles having crystal water (water of hydration) in the phosphate, by performing a heat treatment beforehand at a temperature of more than the baking temperature of the fluororesin composition of the present invention, that is at a temperature exceeding a range of about 360° to 380° C., the crystal water is evaporated and as a result evaporation of the crystal water of the phosphate can be prevented during the above-mentioned baking treatment, thereby preventing crack formation in an obtained molded article.

In order to increase the wear resistance, 0.1 to 15% by weight of phosphorous is preferable, especially 3 to 10% by weight is preferable.

The total amount of the filler and the phosphate in the fluororesin composition of the present invention is preferably not to exceed 40.1% by weight.

The phosphate included is not a substance itself inherently having a lubricating property such as, for example, graphite and molybdenum disulfide as it is, however, the phosphate facilitates the film forming property of a lubricating coating of the PTFE resin on the surface of an opposite member (sliding surface) during sliding with the opposite member after blending with the PTFE resin. Owing to the effect of the phosphate, direct contact (sliding) between the hard carbon fiber to be blended with the PTFE resin and the opposite member is prevented, and a disadvantage of the carbon fiber which can damage the opposite member, thereby decreasing the wear resistance of a sliding member, is suppressed. This is an important requirement necessary for the sliding member to be used under dry friction lubrication.

The phosphate to be used in the present invention has a Mohs hardness in a range of 2 to 4, and by interaction of the phosphate with the filler having a Mohs hardness of 4 to 6, the wear of the opposite member or the fluororesin composition itself, which is caused by the filler, can be effectively suppressed.

In the fluororesin composition of the present invention, in addition to the filler such as the glass fiber etc. and the phosphate there can be optionally added and mixed other additives which are known in the art and are used in order to increase the molding property, the wear resistance, the load resistance and the like, for example, molybdenum disulfide and graphite, and other pigments as well as an agent for imparting electrical conductivity and the like.

The fluororesin composition for a sliding member of the present invention can be preferably used as a starting material of a bearing, a cam, a gear, a sliding plate, a liner tube for a flexible shaft and the like.

In another embodiment of the sliding member of the present invention, the network structures which form the base member may be expanded metal or a metal mesh such as a metal network disclosed in Japanese Patent Publication No. 35107 (1978).

Figure 5:
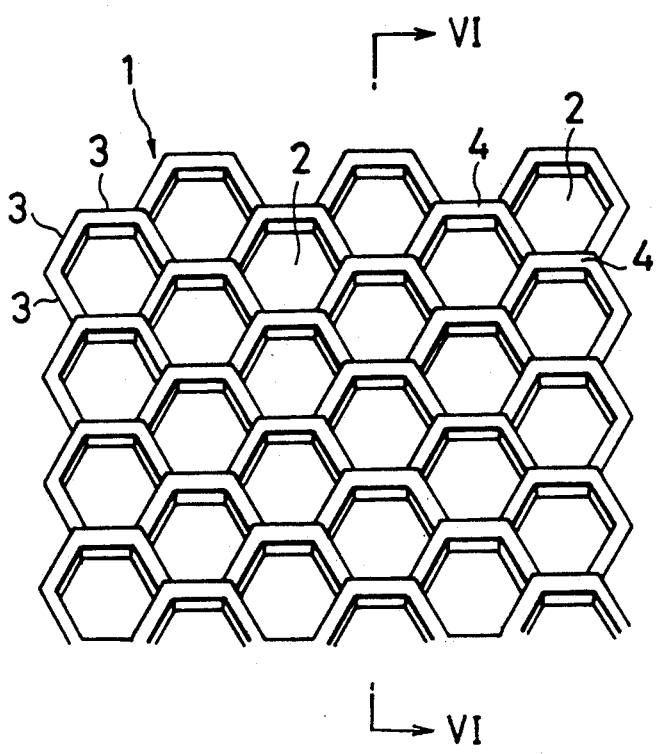
FIG. 5 is a plan view showing a network structure (expanded metal) as a base member.
Figure 6:
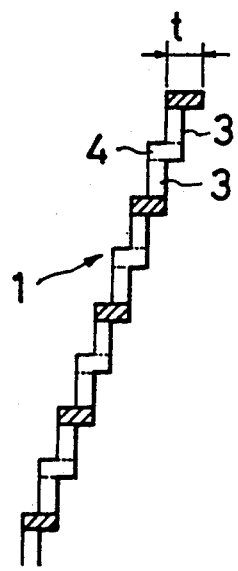
FIG. 6 is a cross-sectional view taken along the line VI—VI in FIG. 5.

FIG. 5 is a plan view showing expanded metal to be used as the base member, and FIG. 6 is a cross-sectional view taken along the line VI—VI in FIG. 5.

In both figures, 1 is expanded metal, 2 is a network, 3 is each side (strand) which forms the network 2, 4 is a connecting portion (bonding portion) of these strands with each other, and t is the thickness of the expanded metal.

The configuration of the network 2 of the expanded metal 1 shown in FIG. 5 is hexagonal, however, the configuration of the network 2 can be rhomboid, rectangular, or other optional polygon, and these also can be used as the base member.

The expanded metal 1 is preferably one having a length of each side of 0.1 to 1.5 mm and a thickness of 0.1 to 1.0 mm.

As metal materials which form the expanded preferred metal are stainless steel, a phosphorous bronze alloy, a bronze alloy and the like.

In addition, the metal mesh is preferably a woven assembled wire mesh which is formed by weaving thin wires of copper, a copper alloy, iron or an iron alloy having a wire diameter of 0.1 to 0.5 mm as the warp and the woof.

In still another embodiment of the sliding member of the present invention, the back plate is composed of a metal thin plate a structural rolled steel thin plate is generally used. However, depending on the use of the sliding member, other steel thin plates or thin plates made of a metal other than steel may be available, or those in which copper plating or the like is applied on these metal thin plates in order to increase the corrosion resistance may be available.

The porous sintered metal layer, which is integrally formed on the back plate, is a copper alloy excellent in friction resistance and wear resistance such as bronze, lead bronze, phosphorous bronze and the like. However, depending on the object and the use, it may be formed from materials other than the copper alloy, for example, an aluminum alloy, iron and the like. The form of particles of the alloy powder is preferably massive or irregular.

Examples of the electrically conductive substance to be used in the sliding member of the present invention include amorphous carbon powder such as coke, anthracite, carbon black, charcoal and the like, graphite carbon powder such as natural graphite, artificial graphite, Kish graphite and the like, copper powder, nickel powder, and soft metal powder such as lead, tin, indium and the like.

Almost all of these conductive substances do not contribute to the increase in the friction and wear resistances, so that special attention is required for the blending ratio.

In the present invention, a range within 0.1 to 10% by weight with respect to the above-mentioned lubricating composition (fluororesin composition) can give a higher conductivity to the lubricating composition without deteriorating the friction and wear resistances.

Next, one example of the production method of the sliding member will be explained.

Preparation of the Lubricating Composition
(Fluororesin Composition)

Into PTFE resin powder are blended 1 to 40% by weight of the carbon fiber, 0.1 to 15% by weight of the phosphate and optionally 0.1 to 10% by weight of the conductive substance, and the ingredients are mixed at a temperature not more than the transition point at room temperature (19° C.) of the PTFE resin to obtain a lubricating composition (fluororesin composition).

This mixing is carried out at a temperature not more than the transition point at room temperature (19° C.) of the PTFE resin, whereby preventing fibrous formation of the PTFE resin without applying shearing force to the PTFE resin, and a homogeneous mixture can be obtained.

Production of the Sliding Member

[I] The fluororesin composition obtained by mixing as described above is pressed and molded at an ordinary temperature to produce a green compact.

The molding pressure is preferably in a range of 300 to 800 kg/cm$^2$.

The baking (heating) of the obtained green compact is carried out at an ordinary pressure in a range of 360° to 380° C. for 2 to 30 hours depending on the kind, amount and the like of the fluororesin powder, so as to melt the fluororesin powder to fuse the resin mixture with each other.

Mechanical processing can be carried out in such a way that after heating the member is cooled to room temperature, followed by convential machining such as for example a lathe in which a superhard tool is used.

Other ways of producing sliding members of the present invention will be described hereinafter.

[II] (a) To 100 parts by weight of the lubricating composition (fluororesin composition) prepared by the above-mentioned method is blended 15 to 25 parts by weight of a petroleum solvent, and the blend is agitated and mixed to give a wetting property to the lubricating composition (fluororesin composition).

The petroleum solvent may be naphtha, toluene, xylene, an aliphatic solvent, and a mixed aliphatic and naphthenic solvent, such as the commercially available solvent "Exonol" (trade name) produced by Exxon Chemical Co., Ltd. which is a mixed aliphatic and naphthenic solvent.

Also, when the petroleum solvent is blended into the lubricating composition, and agitated and mixed to give a wetting property to the lubricating composition, agitation and mixing are carried out at a temperature not more than the transition point at room temperature (19° C.) of the PTFE resin. Agitation and mixing are carried out at the specified temperature range in order to impart the desired wetting property to the composition and to prevent the PTFE resin from forming fibers as PTFE fibers would reduce the moldability properties of the lubricating composition.

When the blending ratio of the petroleum solvent to the lubricating composition is less than 15 parts by weight, the casting property of the lubricating composition is bad in filling and coating to a base member of a network structure as described hereinafter, and nonuniformity is apt to occur during filling of the base member to networks. In addition, when the blending ratio exceeds 25 parts by weight, the filling and coating operations become difficult to carry out, the uniformity of coating thickness is damaged, and the contacting strength between the lubricating composition and the base member becomes bad.

(b) The lubricating composition (fluororesin composition) to which a wetting property has been imparted is sprayed and supplied to the base member of the network structure, which is subjected to roller application to fill the networks of the base member with the lubricating composition. A uniform coating layer of the lubricating composition is formed on the base layer, followed by maintaining for several minutes in a dry furnace heated to a temperature of 200° to 250° C., whereby the petroleum solvent is evaporated and eliminated.

(c) The base member with the networks and the surface filled and coated with the lubricating composition (fluororesin composition) is introduced into a heating furnace and heated for several minutes or ten-odd minutes at a temperature of 360° to 380° C. to bake the lubricating composition. The baked member is removed from the furnace and thereafter passed through a roller to adjust any nonuniformity of a size, thereby obtaining a sliding member.

Figure 7:
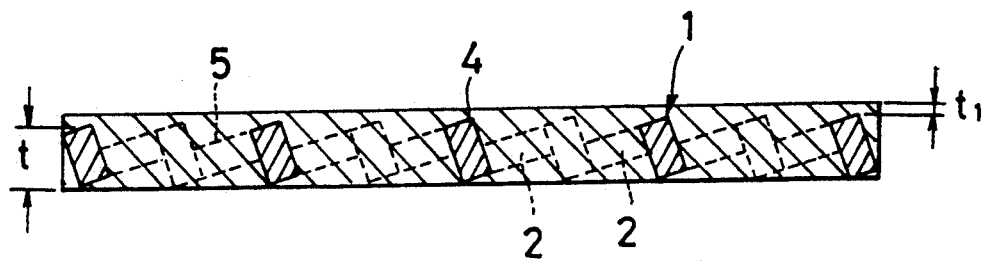
FIG. 7 is a cross-sectional view showing a sliding member.

The sliding member thus obtained is shown in FIG. 7. In the figure, 5 is the lubricating composition (fluororesin composition) formed by filling the networks 2 of the base member 1 of the network structure (expanded metal) to be the coating layer at the surface. $t_1$ represents a thickness of the coating layer, and though dependant on the use, the thickness of 0.05 mm to 1.0 mm is usually preferable.

[III] (a') The lubricating composition (fluororesin composition) to which a wetting property has been given is sprayed and supplied on a porous sintered metal layer formed on the back plate, and is rolled with a roller to impregnate the lubricating composition in the sintered layer, whereby a uniform coating layer of the lubricating composition is formed on the surface of the sintered layer. In this step, the lubricating composition is applied at a thickness which is 2 to 2.5 times the resin coating thickness required for the final product. Almost all of the filling of the resin into cavities of the porous sintered metal layer occurs in this step.

(b') The back plate in which the lubricating composition (fluororesin composition) is impregnated in and coated on the porous sintered metal layer is maintained for several minutes in a dry furnace heated to a temperature of 200° to 250° C., thereby the petroleum solvent is evaporated and eliminated, followed by pressing the dried lubricating composition layer with an applied pressure of about 300 to 600 kg/cm² by a roller so as to obtain a predetermined thickness.

(c') The back plate provided with the dried lubricating composition layer having been pressed by the roller is introduced into a heating furnace to heat for several minutes or ten-odd minutes at a temperature of 360° to 380° C., thereby baking it. The baked member is removed from the furnace and thereafter passed through the roller again to adjust any nonuniformity of a size.

(d') After the size adjustment, the back plate in which a sliding face layer has been formed is cooled, and then it is optionally passed through a correcting roller so as to correct undulation of the back plate, thereby obtaining a desired multi-layer sliding member.

After cutting the multi-layer sliding member to a suitable size, it can be used as a sliding plate as a planar plate, and in addition, after bending and rounding, it can be used as a cylindrical wound bushing.

As illustrated in examples 1 to 25, by using a suitable amount of the phosphate, in the case of using a hollow cylindrical shaft material (SUS304) as an opposite member at a speed of 11 m/min with a load of 40 kg/cm² and a testing period of 8 hrs in a dry state, the wear amount of the sliding member of the present invention is decreased by at least 25%, preferably decreased by 40%, more preferably decreased by 50% as compared with that of a sliding member containing no phosphate.

As clarified by examples 27 to 29 as described hereinafter, the sliding member, in which the fluororesin composition containing the phosphate is filled and coated in the networks and on the surface of the metal network structures, has a friction coefficient not more than 0.20, preferably not more than 0.15 and a wear amount not more than 0.10 mm, preferably not more than 0.08 mm, which is excellent in wear resistance, in the case of using mechanical structural carbon steel (S45C) as an opposite member at a speed of 5 m/min with a load of 100 cm² and a testing period of 8 hrs without lubrication.

In addition, as illustrated in examples 30 to 32, the sliding member, in which the fluororesin composition containing the phosphate is formed on a porous sintered metal layer formed on the steel back plate, has a friction coefficient not more than 0.20, preferably not more than 0.15 and a wear amount not more than 30 μm, preferably not more than 25 μm, more preferably not more than 20 μm, which is excellent in wear resistance, in the case of using mechanical structural carbon steel (S45C) as an opposite member at a speed of 11 m/min with a load of 100 kgf/cm² and a test period of 8 hrs without lubrication.

Therefore, the lubricating composition, which is filled and coated in the networks and on the surface of the base member of the network structure, can be used without settling of the member in a sliding usage such that it exhibits stable performance with a low friction coefficient with no damage to the opposite member during sliding with the opposite member. The coating composition becomes intimate with the surface of the opposite member due to the flexibility provided in the thickness direction of the base member, grasps the opposite member with great holding force, and smoothly supports rotation and the like of the opposite member.

The lubricating composition which is filled in and coated on the networks and on the surface of the base member has an electrical charge-preventing property because it is conductive, so that no special means are needed to provide conductivity.

The lubricating composition which is impregnated in and coated on the porous sintered metal layer formed on the back plate exhibits stable performance with low friction coefficient and no damage to the opposite member during sliding with the opposite member.

The lubricating composition which is impregnated in and coated on the porous sintered metal layer formed on the back plate has conductivity, so that it can be used for a sliding portion of various equipment requiring change-prevention.

The present invention will be further explained in detail according to examples hereinafter, however, the present invention is not limited to these examples.

EXAMPLES 1 to 25

Various phosphates and fillers were mixed with PTFE in ratios shown in the Table 1. They were homogeneously mixed with a Henshell mixer, and the mixed powder was charged into a mold for molding at a room temperature at a molding pressure of 500 kg/cm², thereby producing a green compact. The green compact was heated under an ordinary pressure at 370° C. for 5 hours to form a molded raw material. The heated member was cooled to a room temperature followed by processing to produce a plate-shaped sliding member sample piece having sides 30 mm × 30 mm × thickness 5 mm.

This sample was contacted with sliding against an end face of a hollow cylindrical shaft material (inner diameter 20 mm × outer diameter 25.6 mm, material quality: SUS 304) under the following conditions for a thrust test.

| Test condition: | |
| --- | --- |
| Speed | 11 m/min |
| Load | 40 kg/cm² |
| Period | 8 hr |
| Lubrication | dry |

The friction coefficient is shown as a changing value 1 to 8 hours after the start of the test.

Results are shown in Table 1.

As shown in Table 1, the fluororesin composition containing the glass fiber or other filler and containing a suitable amount of phosphate according to the present invention, exhibited improved wear resistance.

COMPARATIVE EXAMPLE I

A plate-shaped sliding member was prepared using the same procedures as described in Example 1, except no phosphate was included in the mixture.

The wear amount and friction coefficient of the prepared member are shown in Table 1.

EXAMPLES 26

This example investigated adding various amounts of phosphate and filler and observing how the wear resistance of the fluororesin composition changes. The conditions of the thrust test were the same as described above.

Figure 2:
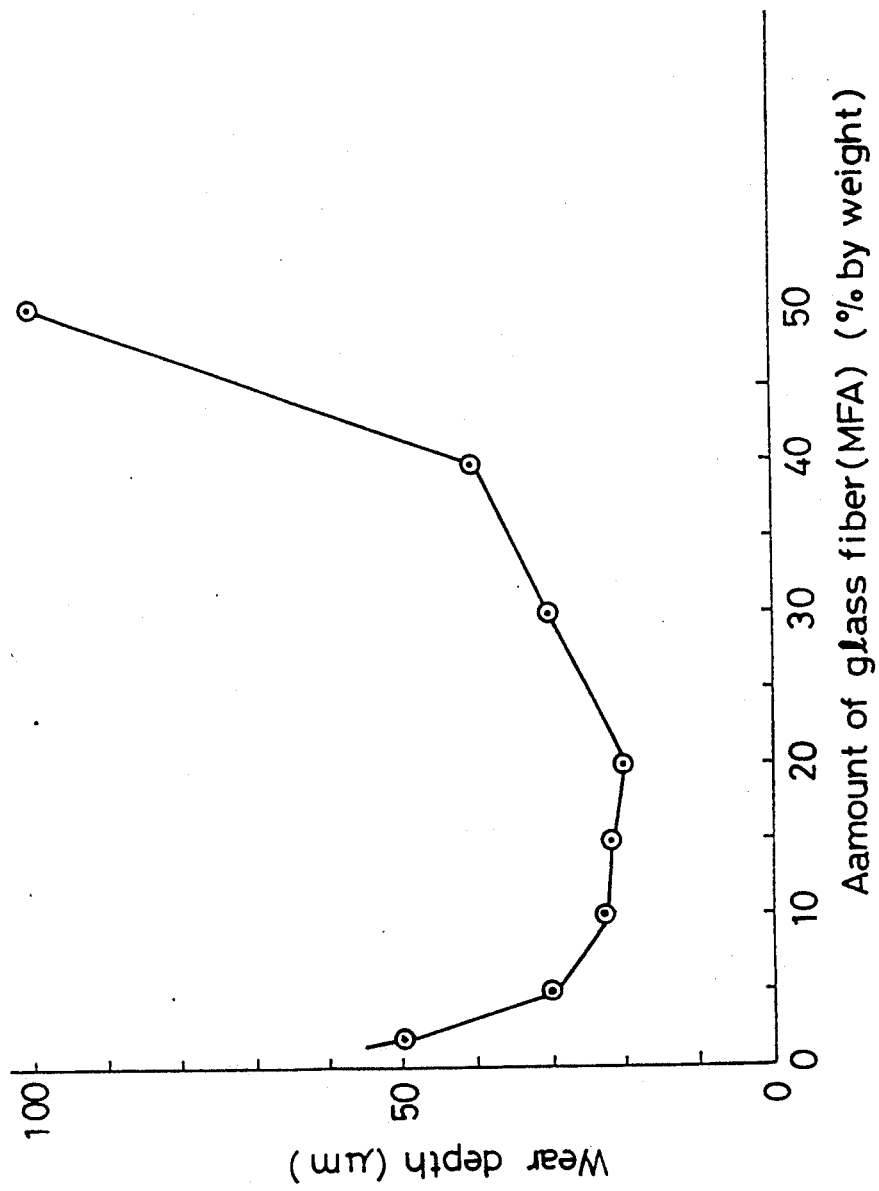

The results are shown in FIGS. 1 to 4. As illustrated in FIGS. 1 and 2, the amounts of glass fiber and phosphate are preferably 1 to 40% by weight and 0.1 to 15% by weight, respectively.

Figure 3:
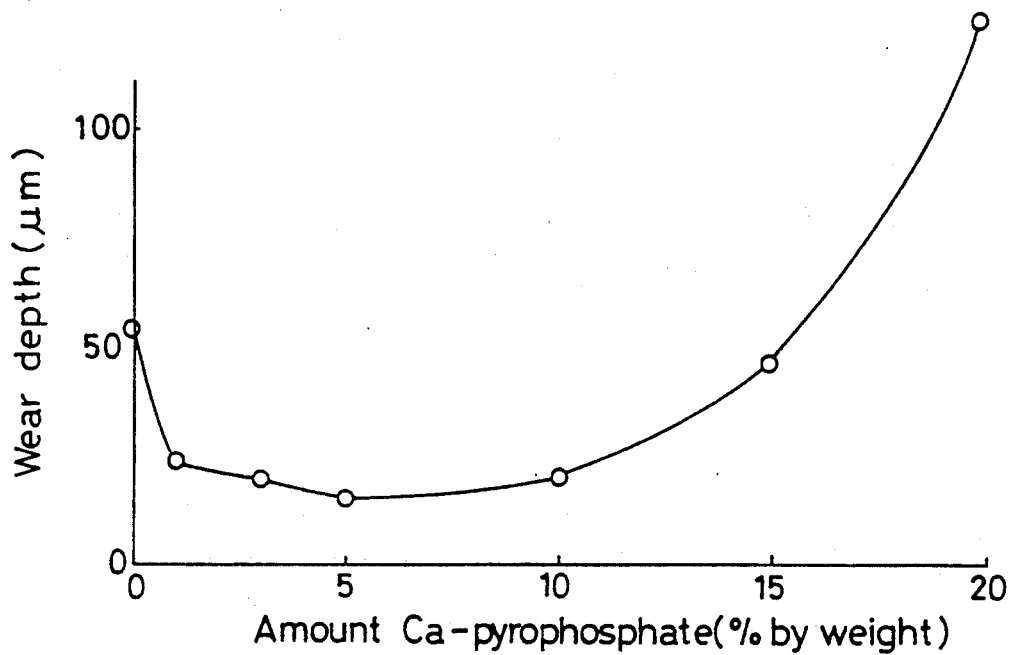
Figure 4:
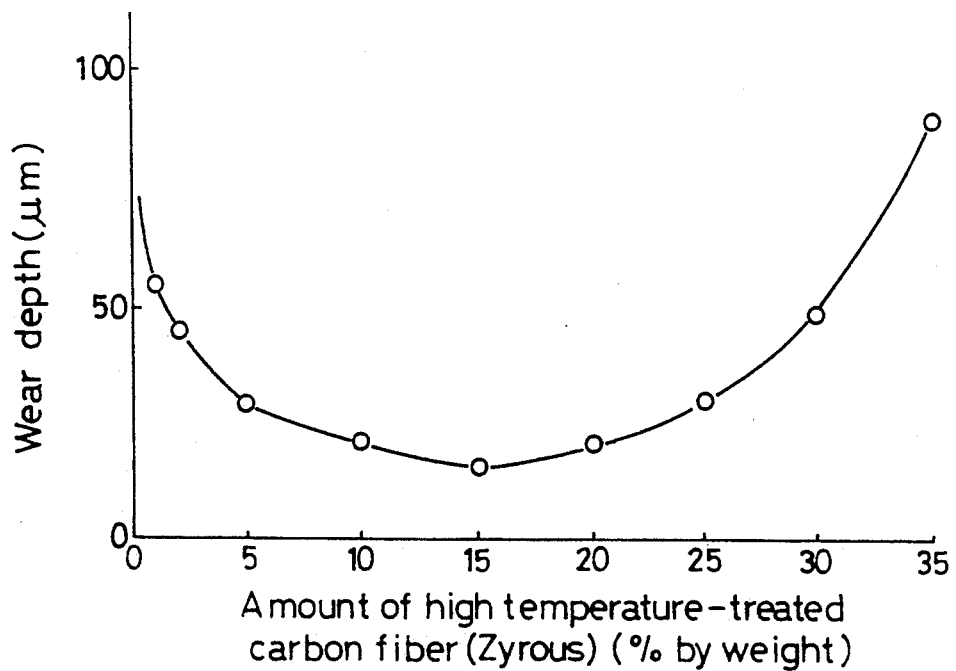

In addition, as shown in FIGS. 3 and 4 the amounts of carbon fiber and phosphate are preferably 1 to 30% by weight and 0.1 to 15% by weight, respectively.

EXAMPLE 27

Base Member

A phosphorous bronze alloy plate having a plate thickness of 0.3 mm was expanded to form an expanded metal having a thickness of 0.43 mm having hexagonal regular networks with each side (strand) of 0.6 mm. This was used as a base member.

In FIG. 5, the length of symbol 3 was 0.6 mm, and in FIG. 6, the thickness of symbol t was 0.43 mm.

Lubricating (Fluororesin) Composition

The PTFE resin used was "Teflon 6CJ" (produced by Mitsui du Pont Fluorochemical Co., Ltd.) having an average particle size not more than 80 μm. Then 65 to 90% by weight of this PTFE resin powder, 5 to 30% by weight of carbon fiber having a diameter of 10 μm and a length of 100 μm ("Zyrous GPMF100JL" produced by Nitto Boseki Co., Ltd.) and 5% by weight of calcium pyrophosphate passing through a 350 mesh seive ($Ca_2P_2O_7$: produced by Kanto Chemical Co., Ltd.) as a phosphate were introduced into a Henshell mixer, and were mixed at a temperature not more than the transition point at a room temperature of the PTFE resin to obtain various lubricating compositions.

Production Steps (a) To 100 parts by weight of this lubricating composition was blended 20 parts by weight of an aliphatic and naphthenic mixed solvent ("Exol" produced by Exxon Chemical Co., Ltd.) as a petroleum solvent. The solvent and lubricating composition were mixed at a temperature not more than the transition point of the PTFE resin at room temperature to impart a a wetting property to the lubricating composition.

(b) The lubricating composition to which the wetting property had been given was scattered and applied to a base member of the above-mentioned expanded metal, and was rolled to fill the networks of the base member with the lubricating composition and form a uniform coating layer of the lubricating composition on the surface of the base member. This was followed by heating for 5 minutes in a dry furnace heated to a temperature of 220° C., thereby evaporating and eliminating the petroleum solvent in the lubricating composition.

(c) The base member, in which the networks and the surface were filled and coated with the lubricating composition, was introduced into a heating furnace, and was heated for 10 minutes at a temperature of 360° C. to bake of the lubricating composition, then removed from the furnace.

A thickness of the surface coating layer of the lubricating composition of the sliding member thus obtained was 0.13 mm (a thickness of the symbol $t_1$ i FIG. 7).

The components of the lubricating composition of the sliding member of this Example 27 are shown in Table 2.

EXAMPLE 28

Base Member

A base member of the same expanded metal as that of Example 27 was used.

Lubricating (Fluororesin) Composition

The PTFE resin used was "Teflon 6CJ" (produced by Mitsui du Pont Fluorochemical Co., Ltd.) having an average particle size not more than 80 μm.[, and] Then 75 to 85% by weight of this PTFE resin powder, 10 to 20% by weight of carbon fiber having a diameter of 10 μm and a length of 100 μm ("Zyrous GPMF100JL" produced by Nitto Boseki Co., Ltd.) and 5% by weight of lithium pyrophosphate passing through a 350 mesh seive ($Li_4P_2O_7$: produced by Kanto Chemical Co., Ltd.) as a phosphate were introduced into a Henshell mixer, and were mixed at a temperature not more than the transition point at a room temperature of the PTFE resin to obtain various lubricating compositions.

And then, production steps (a), (b), and (c), which were the same as those of Example 27, we used to obtain sliding members.

The components of the lubricating composition of the sliding member of this Example 28 are shown in Table 2.

EXAMPLE 29

Base Member

A base member of the same expanded metal as that of Example 27 was used.

Lubricating (Fluororesin) Composition

The PTFE resin used was "Teflon 6CJ" (produced by Mitsui du Pont Fluorochemical Co., Ltd.) having an average particle size not more than 80 μm.[, and] Then 72 to 87% by weight of this PTFE resin powder, 5 to 20% by weight of carbon fiber having a diameter of 10 μm and a length of 100 μm ("Zyrous GPMF100JL" produced by Nitto Boseki Co., Ltd.), 5% by weight of calcium pyrophosphate passing through a 350 mesh (produced by Kanto Chemical Co., Ltd.) as a phosphate, and 3% by weight of carbon black (CB3750: produced by Mitsubishi Chemical Industries Ltd.) as a conductive substance were introduced into a Henshell mixer, and were mixed at a temperature not more than the transition point at a room temperature of the PTFE resin to obtain various lubricating compositions.

And then, production steps (a), (b), and (c), which were the same as those of Example 27, were used to obtain sliding members.

The components of the lubricating composition of the sliding member of this Example 29 is shown in Table 2.

COMPARATIVE EXAMPLE II

Base Member

A base member of the same expanded metal as that of Example 27 was used.

Lubricating Composition

The PTFE resin used was "Teflon 6CJ" (produced by Mitsui du Pont Fluorochemical Co., Ltd.) having an average particle size not more than 80 μm.[, and] Next 70% by weight of this PTFE resin powder, and 30% by weight of carbon fiber having a diameter of 10 μm and a length of 100 μm were introduced into a Henshell mixer, and were mixed at a temperature not more than the transition point at a room temperature of the PTFE resin to obtain various lubricating compositions.

And then, production steps (a), (b), and (c), which were the same as those of Example 27, were used to obtain sliding member.

The components of the lubricating composition of the sliding member of this Comparative example II is shown in Table 2.

Next, results of tests are described for the friction and wear resistance and the volume resistivity (Ω·cm) of the sliding members obtained by Examples 27 to 29 and Comparative example II.

Friction and Wear Resistance

With respect to the friction and wear resistance, the following sliding conditions were used.

| (Sliding condition) | |
|---|---|
| Sliding speed | 5 m/min |
| Load | 100 kgf/cm$^2$ |
| Test period | 8 hours |
| Lubrication | no lubrication |
| Companion member | mechanical structural carbon steel (S45C) |

A change in the value of the friction coefficient from the start of the test to the end of the test was observed, and the wear amount after 8 hours was measured.

Volume Resistivity

Volume resistivity in a direction perpendicular to each sliding member surface was measured by a four probe resistivity measuring method using a resistivity meter (Lolester AP Mcp-T400 produced by Mitsubishi Petrochemical Co., Ltd.).

The friction and wear resistance and volume resistivity of each sliding member are shown in Table 2. According to the test results in Table 2, the sliding members of Example 27 to Example 28 exhibited stable performance throughout the test period with low friction coefficients and had extremely small wear amounts of the sliding members after the tests.

Although the sliding member of Example 27-vi contained 30% by weight of carbon fiber, no damage was found on the surface of the opposite member after the test. In addition, Values of $10^8$ to $10^{-3}$ were measured for volume resistivity.

Sufficiently satisfactory performance was obtained considering the fact that generally, with respect to the charge-preventing effect required for sliding portions of office equipment cabinets, the volume resistivity was not more than $10^8$, and conductivity required following exterior painting after assembling a sliding member to a door hinge, the volume resistivity was not more than $10^3$.

On the other hand, the sliding member of Comparative example II is an excellent material as to charge-preventing effect and conductivity, however, the friction coefficient is high, and with respect to the wear amount, even the base member is invaded, and considerable thin stripe-shaped damage was found on the surface of the opposite member.

In these examples an expanded metal has been used as the base member of the network structure, however, even when a metal mesh, which is formed by weaving metal thin wires as the base member in the warp and the woof is used, the same effect can be obtained.

EXAMPLE 30

The PTFE resin used was "Teflon 6CJ" (produced by Mitsui du Pont Fluorochemical Co., Ltd.) having an average particle size not more than 80 μm.[, and] Next 65 to 90% by weight of this PTFE resin powder, 5 to 30% by weight of CF having a diameter of 12 μm and a length of 100 μm ("Zyrous GPMF100JL" produced by Nitto Boseki Co., Ltd.) and 5% by weight of calcium pyrophosphate passing through a 350 mesh seive (produced by Kanto Chemical Co., Ltd.) as a phosphate were introduced into a Henshell mixer to grind and mix, and with respect to 100 parts by weight of the mixed powder, as a petroleum solvent was blended 20 parts by weight of an aliphatic and naphthenic mixed solvent ("Exol" produced by Exxon Chemical Co., Ltd.), which were mixed at a temperature not more than the transition point at a room temperature of the PTFE resin to obtain wetting of the lubricating compositions.

The wetting lubricating composition was applied to a porous sintered metal layer formed on a steel back plate of a metal thin plate, and was rolled with a roller to obtain a multi-layer plate of a thickness of 1.20 mm. The multi-layer plate was maintained for 5 minutes in a hot air dry furnace heated to a temperature of 200° C. to evaporate and eliminate the solvent, followed by pressing the dry lubricating composition layer with a pressing pressure of 400 kg/cm$^2$ with a roller to give a thickness of 1.05 mm.

Next, the multi-layer plate was introduced into a heating furnace to heat and bake at a temperature of 370° C. for 10 minutes, followed by pressing with a roller again as needed for size adjustment and correction of undulation of the plate and the like, followed by cutting to obtain a plate-shaped sliding member test piece having sides 30 mm × 30 mm × thickness 1.05 mm.

The components of the lubricating composition of the sliding member of this Example 30 are shown in Table 3.

EXAMPLE 31

The PTFE resin used was "Teflon 6CJ" (produced by Mitsui du Pont Fluorochemical Co., Ltd.) having an average particle size of not more than 80 μm.[, and] Next 75 to 82% by weight of this PTFE resin powder, 15% by weight of CF having a diameter of 12 μm and a length of 100 μm and 3 to 10% by weight of lithium pyrophosphate passing through a 350 mesh (produced by Yoneyama Chemical Industries Co., Ltd.) as a phosphate were introduced into a Henshell mixer to grind and mix, and with respect to 100 parts by weight of the mixed powder, as a petroleum solvent was blended 20 parts by weight of an aliphatic and naphthenic mixed solvent ("Exol" produced by Exxon Chemical Co., Ltd.), and were mixed at a temperature not more than the transition point at a room temperature of the PTFE resin to obtain various wetting lubricating compositions.

The same procedures as in Example 30 were used to obtain a plate-shaped sliding member test piece having sides 30 mm×30 mm×thickness 1.05 mm.

The components of the lubricating composition of the sliding member of this Example 31 are shown in Table 3.

EXAMPLE 32

The PTFE resin used was "Teflon 6CJ" (produced by Mitsui du Pont Fluorochemical Co., Ltd.) having an average particle size not more than 80 μm.[and] Next 73 to 88% by weight of this PTFE resin powder 5 to 20% by weight of CF having a diameter of 12 μm and a length of 100 μm, 5% by weight of calcium pyrophosphate passing through a 350 mesh (produced by Kanto Chemical Co., Ltd.) as a phosphate, and 2% by weight of carbon black (produced by Mitsubishi Chemical Industries Ltd.: CB3750, hereinafter referred to as "CB") as a conductive substance were introduced into Henshell mixer to grind and mix, and with respect to 100 parts by weight of the mixed powder, as a petroleum solvent was blended 20 parts by weight of an aliphatic and naphthenic mixed solvent ("Exol" produced by Exxon Chemical Co., Ltd.), and were mixed at a temperature not more than the transition point at a room temperature of the PTFE resin to obtain various wetting lubricating compositions.

Samples we prepared as in Example 30 to obtain a plate-shaped sliding member test piece having sides 30 mm×30 mm×thickness 1.05 mm.

The components of the lubricating composition of the sliding member of this Example 32 are shown in Table 3.

COMPARATIVE EXAMPLE III

The PTFE resin used was "Teflon 6CJ" (produced by Mitsui du Pont Fluorochemical Co., Ltd.) having an average particle size not more than 80 μm[, and] Next 70 to 83% by weight of this PTFE resin powder, ① 30% by weight of CF having a diameter of 12 μm and a length of 100 μm, or ② 15% by weight of CF having a diameter of 12 μm and a length of 100 μm and 2% by weight of CB as a conductive substance were introduced into a Henshell mixer to grind and mix, and with respect to 100 parts by weight of the mixed powder, as a petroleum solvent was blended 20 parts by weight of an aliphatic and naphthenic mixed solvent ("Exol" produced by Exxon Chemical Co., Ltd.), and were mixed at a temperature not more than the transition point at a room temperature of the PTFE resin to obtain wetting lubricating compositions.

Samples were prepared using the procedure of Example 30 to obtain a plate-shaped sliding member test piece having sides 30 mm×30 mm×thickness 1.05 mm.

The components of the lubricating composition of the sliding member of this Comparative example III are shown in Table 3.

Next, friction, wear resistance and volume resistivity (Ω·cm) of the sliding members obtained by the above-mentioned Examples 30 to 32 and Comparative example III were measured.

Friction and Wear Resistance

The following sliding conditions were used to measure friction and wear resistance.

| (Sliding condition) | |
| --- | --- |
| Sliding speed | 11 m/min |
| Load | 100 kgf/cm |
| Test period | 8 hours |
| Lubrication | no lubrication |
| Companion member | mechanical structural carbon steel (S45C) |

Friction coefficient changed one hour after the start of the test. Wear amount after 8 hours of the test period was measured.

Volume Resistivity

Volume resistivity in a direction perpendicular to each sliding member surface was measured by a four probe resistivity measuring method using a resistivity meter (Lolester AP Mcp-T400 produced by Mitsubishi Petrochemical Co., Ltd.).

Friction, wear resistance and volume resistivity of each sliding member are shown in Table 3.

According to these test results, the sliding members of Example 30 to Example 32 exhibited stable performance through the test period with low friction coefficients and had extremely small amounts wear after the tests.

Although the sliding member of Example 30-vi contained 30% by weight of CF, no damage was found on the surface of the opposite member after the test.

Values of $10^8$ to $10^{-1}$ were reported for volume resistivity.

Sufficiently satisfactory performance was attaind considering that generally the conductivity required for sliding portions of office equipment, the volume resistivity is not more than $10^8$.

In contrast, although the sliding members of Comparative example III are very excellent materials with regard to conductivity, friction coefficients were high, and wear amounts also were large, with significant thin stripe-shaped damage observed on the surface of the opposite member.

TABLE 1

| Ex. No. | Lubricant composition (% by weight) | Wear amount (μm) | Friction coefficient |
| --- | --- | --- | --- |
| 1 | GF (MFB) 15% + Ca-pyrophosphate 5% + MoS$_2$ 1% [Ca$_2$P$_2$O$_7$] | 24.59 | 0.11~0.12 |
| 2 | GF (MFB) 15% + Ca-pyrophosphate 5% + BN 2% [Ca$_2$P$_2$O$_7$] | 29.65 | 0.13~0.16 |
| 3 | GF (MFB) 15% + Ca-pyrophosphate 5% [Ca$_2$P$_2$O$_7$] | 22.70 | 0.12~0.13 |
| 4 | GF (MFA) 15% + Tri Ca-phosphate 5% [Ca$_3$(PO$_4$)$_2$] | 18.38 | 0.14~0.2 |
| 5 | GF (MFA) 15% + Al-tripolyphosphate 5% [Al$_5$(P$_3$O$_{10}$)$_3$] | 34.27 | 0.12~0.22 |
| 6 | GF (MFA) 15% + Hydroxyapatite | 23.96 | 0.15~0.21 |

TABLE 1-continued

| | Lubricant composition (% by weight) | Wear amount (μm) | Friction coefficient |
|---|---|---|---|
| | 5% [$Ca_{10}(PO_4)_6(OH)_2$] | | |
| 7 | GF (MFA) 15% + Ca-pyrophosphate 5% [$Ca_2P_2O_7$] | 23.41 | 0.11~0.16 |
| 8 | GF (MFA) 15% + Li-phosphate 5% [$Li_3PO_4$] | 22.72 | 0.13~0.16 |
| 9 | GF (MFA) 15% + Li-pyrophosphate 5% [$Li_4P_2O_7$] | 26.03 | 0.1~0.115 |
| 10 | GF (MFA) 15% + Zn-phosphate 5% [$Zn(PO_4)_2$] | 48.65 | 0.16~0.2 |
| 11 | GF (MFA) 15% + Ca-hydrogenphosphate 5% (anhydrous) [$CaHPO_4$] | 22.00 | 0.1~0.11 |
| 12 | GF (MFA) 15% + Ca-phosphate 5% [$CaPHO_3.2H_2O$] | 46.21 | 0.125~0.2 |
| 13 | GF (MFA) 15% + Zn-pyrophosphate 5% [$Zn_2P_2O_7$] | 43.82 | 0.12~0.195 |
| 14 | GF (MFA) 15% + Mg-phosphate 5% [$Mg_3(PO_4)_2.8H_2O$] | 35.03 | 0.135~0.15 |
| 15 | GF (MFA) 15% + Mg-hydrogenphosphate 5% [$MgHPO_43H_2O$] | 48.27 | 0.165~0.21 |
| 16 | GF (MFA) 15% + Ca-hydrogenphosphate dihydrate 5% [$CaHPO_4.2H_2O$] | 22.55 | 0.11~0.12 |
| 17 | CF (low) 15% + ca-pyrophosphate 5% [$Ca_2P_2O_7$] | 14.83 | 0.11~0.12 |
| 18 | CF (high) 15% + ca-pyrophosphate 5% [$Ca_2P_2O_7$] | 13.52 | 0.10~0.11 |
| 19 | CF (high) 15% + Ca-hydrogenphosphate 5% (anhydrous) [$CaHPO_4$] | 13.26 | 0.11~0.115 |
| 20 | CF (high) 15% + Li-phosphate 5% [$Li_3PO_4$] | 14.76 | 0.11~0.12 |
| 21 | Bellpearl C600 15% + ca-pyrophosphate 5% [$Ca_2P_2O_7$] | 19.06 | 0.11~0.125 |
| 22 | Bellpearl C2000 15% + ca-pyrophosphate 5% [$Ca_2P_2O_7$] | 20.44 | 0.105~0.115 |
| 23 | Pre-calcined coke 15% + ca-pyrophosphate 5% (average particle size 14 μm) [$Ca_2P_2O_7$] | 19.88 | 0.11~0.12 |
| 24 | Kainol CF16BT 15% + Ca-pyrophosphate 5% [$Ca_2P_2O_7$] | 29.10 | 0.105~0.11 |
| 25 | Pyrofil (PAN type) 15% + Ca-pyrophosphate 5% [$Ca_2P_2O_7$] | 12.00 | 0.11~0.115 |

| Com. Ex. I | Lubricant composition (% by weight) | Wear amount (μm) | Friction coefficient |
|---|---|---|---|
| a | GF (MFA) 15% | 65.30 | 0.17~0.25 |
| b | GF (MFA) 20% | 76.33 | 0.15~0.235 |
| c | CF (low temperature-treated article) 15% | 57.75 | 0.13~0.23 |
| d | CF (high temperature-teated article) 15% | 53.50 | 0.12~0.24 |
| e | CF (high) 15% + Ca-carbonate 5% [$CaCO_3$] | 39.88 | 0.13~0.24 |
| f | CF (high) 15% + Graphite (CSSP) 3% | 46.44 | 0.12~0.22 |
| g | CF (high) 15% + Molybdenum disulfide (UP-15) | 61.28 | 0.11~0.28 |
| h | Globular phenol resin 15% (Bellpearl C600) | 44.27 | 0.115~0.18 |
| i | Bellpearl C2000 15% | 36.74 | 0.115~0.19 |
| j | Pre-calcined coke 15% (average particle size 14 μm) | 51.38 | 0.105~0.24 |
| k | Phenol carbon fiber 15% (Kainol CF16BT) | 39.50 | 0.12~0.21 |
| l | Pyrofil (PAN type) 15% | 79.42 | 0.13~0.25 |

(Note)
GF (MFB): glass fiber (MFB) produced by Asahi Fiber Glass Co., Ltd.: 0 = 13 μm, 1 = 100~300 μm
GF (MFA): glass fiber (MFA) produced by Asahi Fiber Glass Co., Ltd.: 0 = 13 μm, 1 = 30~100 μm
CF: carbon fiber, pitch type, trade name: Zyrous (Nitto Boseki Co., Ltd.), average length = 100 μm, diameter = φ12 μm
Low temperature-treated article: treated at 1000 to 1500° C.
High temperature-treated article: treated at 2000 to 2500° C.
Bellpearl C600: Bellpearl R800 is treated at 600° C.
Bellpearl C2000: Bellpearl R800 is treated at 2000° C.
Balance of the lubricant composition in the table is PTFE.

TABLE 2

| | | Lubricating composition (% by weight) | | | | Friction coefficient | Wear amount (mm) | Volume resistivity ($\Omega \cdot cm$) |
|---|---|---|---|---|---|---|---|---|
| | | PTFE | Carbon fiber | Phosphate | Conductive substance | | | |
| Ex. 27 | i | 90 | 5 | $Ca_2P_2O_7$ 5 | — | 0.06~0.08 | 0.07 | $1 \times 10^8$ |
| | ii | 85 | 10 | $Ca_2P_2O_7$ 5 | — | 0.07~0.10 | 0.06 | $1.4 \times 10^6$ |
| | iii | 80 | 15 | $Ca_2P_2O_7$ 5 | — | 0.07~0.10 | 0.04 | $3.2 \times 10$ |
| | iv | 75 | 20 | $Ca_2P_2O_7$ 5 | — | 0.09~0.10 | 0.02 | $4.5 \times 10^{-2}$ |
| | v | 70 | 25 | $Ca_2P_2O_7$ 5 | — | 0.10~0.12 | 0.07 | $9.8 \times 10^{-3}$ |
| | vi | 65 | 30 | $Ca_2P_2O_7$ 5 | — | 0.11~0.14 | 0.08 | $9.3 \times 10^{-3}$ |
| Ex. 28 | i | 85 | 10 | $Li_4P_2O_7$ 5 | — | 0.08~0.10 | 0.07 | $1.4 \times 10^6$ |
| | ii | 80 | 15 | $Li_4P_2O_7$ 5 | — | 0.07~0.10 | 0.04 | $3.0 \times 10$ |
| | iii | 75 | 20 | $Li_4P_2O_7$ 5 | — | 0.08~0.11 | 0.02 | $4.7 \times 10^{-2}$ |
| Ex. 29 | i | 87 | 5 | $Ca_2P_2O_7$ 5 | Carbon black 3 | 0.07~0.09 | 0.08 | $1 \times 10$ |
| | ii | 82 | 10 | $Ca_2P_2O_7$ 5 | Carbon black 3 | 0.07~0.10 | 0.07 | $5.6 \times 10^{-1}$ |
| | iii | 77 | 15 | $Ca_2P_2O_7$ 5 | Carbon black 3 | 0.08~0.10 | 0.05 | $4.3 \times 10^{-2}$ |
| | iv | 72 | 20 | $Ca_2P_2O_7$ 5 | Carbon black 3 | 0.10~0.11 | 0.02 | $9.6 \times 10^{-3}$ |
| * | | 70 | 30 | — | — | 0.28~0.35 | 0.23 | $8.7 \times 10^{-3}$ |

*Comparative example II

TABLE 3

| | | Lubricating composition, % by weight | | | | Friction coefficient | wear amount $\mu m$ | Volume resistivity $\Omega \cdot cm$ |
|---|---|---|---|---|---|---|---|---|
| | | PTFE | CF | Phosphate | CB | | | |
| Ex. 30 | i | 90 | 5 | 5 | — | 0.10~0.11 | 14 | $4.1 \times 10^8$ |
| | ii | 85 | 10 | 5 | — | 0.09~0.11 | 12 | $1.1 \times 10^5$ |
| | iii | 80 | 15 | 5 | — | 0.10~0.11 | 8 | $1.2 \times 10^3$ |
| | iv | 75 | 20 | 5 | — | 0.10~0.11 | 5 | $5.5 \times 10^1$ |
| | v | 70 | 25 | 5 | — | 0.11~0.13 | 15 | $6.3 \times 10^0$ |
| | vi | 65 | 30 | 5 | — | 0.12~0.15 | 20 | $8.8 \times 10^{-1}$ |
| Ex. 31 | i | 82 | 15 | 8 | — | 0.10~0.12 | 12 | $5.5 \times 10^2$ |
| | ii | 80 | 15 | 5 | — | 0.10~0.11 | 7 | $7.4 \times 10^2$ |
| | iii | 75 | 15 | 10 | — | 0.12~0.14 | 18 | $8.2 \times 10^2$ |
| Ex. 32 | i | 88 | 5 | 5 | 2 | 0.09~0.11 | 18 | $7.6 \times 10^3$ |
| | ii | 83 | 10 | 5 | 2 | 0.10~0.11 | 9 | $1.4 \times 10^2$ |
| | iii | 78 | 15 | 5 | 2 | 0.10~0.11 | 6 | $8.1 \times 10^0$ |
| | iv | 73 | 20 | 5 | 2 | 0.11~0.12 | 8 | $1.5 \times 10^0$ |
| * | i | 70 | 30 | — | — | 0.20~0.33 | 65 | $8.6 \times 10^{-1}$ |
| | ii | 83 | 15 | — | 2 | 0.22~0.88 | 96 | $8.2 \times 10^1$ |

*Comparative example III

What is claimed is:

1. A fluororesin composition for a sliding member consisting essentially of a fluororesin, from 1 to 40% by weight of at least one of filler selected from the group consisting of glass fiber, glass powder, carbon fiber and carbon powder, and 0.1 to 15% by weight of a phosphate selected from the group consisting of $Li_3PO_4$, $Li_2HPO_4$, $Li_4P_2O_7$, $Ca_3(PO_4)_2$, $Ca_2O_2O_7$, $CaHPO_4(.2-H_2O)$ and hydroxyapatite.

2. The composition according to claim 1, wherein the total amount of the filler and phosphate is not more than 40.1% by weight.

3. The composition according to claim 1, wherein said fluororesin is a polytetrafluoroethylene.

4. The composition according to claim 1, wherein said filler is glass fiber or glass powder.

5. The composition according to claim 4, wherein said composition contains 1 to 40% by weight of glass fiber or glass powder and 0.1 to 15% by weight of the phosphate.

6. The composition according to claim 5, wherein said composition contains 5 to 30% by weight of glass fiber or glass powder and 3 to 10% by weight of the phosphate.

7. The composition according to claim 1, wherein said filler is carbon fiber or carbon powder.

8. The composition according to claim 7, wherein said composition contains 1 to 30% by weight of carbon fiber or carbon powder and 0.1 to 15% by weight of the phosphate.

9. The composition according to claim 8, wherein said composition contains 2 to 20% by weight of carbon fiber or carbon powder and 3 to 10% by weight of the phosphate.

10. A sliding member obtained by pressing and molding said fluororesin composition as claimed in claim 1, and baking the obtained green compact.

11. A sliding member comprising a metal network structure as a base member and the fluororesin composition as claimed in claim 1 filled in networks and coated on the surface of the base member.

12. The sliding member according to claim 11 comprising the metal network structure as a base member and the fluororesin composition which is filled in the networks and coated on the surface of the base member, and which the fluororesin composition, comprises a polytetrafluoroethylene, 5 to 30% by weight of carbon fiber as the filler and 0.1 to 15% by weight of the phosphate.

13. The sliding member according to claim 12, wherein said fluororesin composition further contains 0.1 to 10% by weight of a electrically conductive substance.

14. The sliding member according to claim 13, wherein said electrically conductive substance is at least one selected from the group consisting of amorphous carbon powder, graphite carbon powder, copper powder, nickel powder and soft metal powder.

15. The sliding member according to claim 11 or 12, wherein the metal network structure is expanded metal or a metal mesh provided with regular networks.

16. A multi-layer sliding member comprising a porous sintered metal layer formed on a steel back plate and the fluororesin composition as claimed in claim 1 which is impregnated in and coated on the porous sintered metal layer.

17. The multi-layer sliding member according to claim 16 comprising the porous sintered metal layer formed on a steel back plate and the fluororesin composition which is impregnated in and coated on the porous sintered metal layer, and which the fluororesin composition comprises a polytetrafluoroethylene, 5 to 30% by weight of carbon fiber as the filler and 0.1 to 15% by weight of the phosphate.

18. The multi-layer sliding member according to claim 17, wherein said composition further contains 0.1 to 10% by weight of electrically conductive substance.

19. The multi-layer sliding member according to claim 18, wherein said electrically conductive substance is at least one selected from the group consisting of amorphous carbon powder, graphite carbon powder, copper powder, nickel powder and soft metal powder.

* * * * *